Feb. 28, 1967  W. MARTIN, JR  3,306,239
METHOD AND MEANS FOR TRANSPLANTING
Filed Jan. 12, 1965  7 Sheets-Sheet 1

INVENTOR
Wayne Martin, Jr.

BY *Alexander & Dowell*
ATTORNEYS

Feb. 28, 1967  W. MARTIN, JR  3,306,239
METHOD AND MEANS FOR TRANSPLANTING
Filed Jan. 12, 1965  7 Sheets-Sheet 3

INVENTOR
Wayne Martin, Jr.

BY *Alexander F. Dowell*
ATTORNEYS

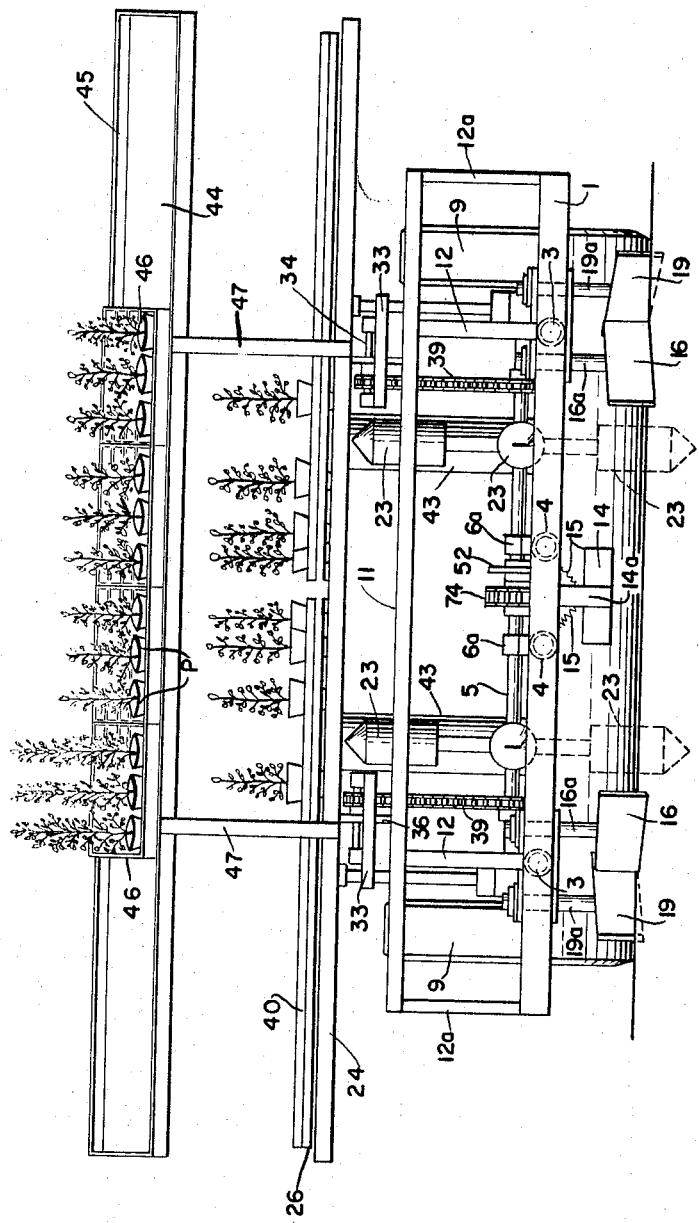

Feb. 28, 1967    W. MARTIN, JR    3,306,239
METHOD AND MEANS FOR TRANSPLANTING
Filed Jan. 12, 1965    7 Sheets-Sheet 7

INVENTOR
Wayne Martin, Jr

BY Alexander & Dowell
ATTORNEY.

United States Patent Office 3,306,239
Patented Feb. 28, 1967

3,306,239
METHOD AND MEANS FOR TRANSPLANTING
Wayne Martin, Jr., 434 N. High St.,
Hillsboro, Ohio 45133
Filed Jan. 12, 1965, Ser. No. 424,943
20 Claims. (Cl. 111—1)

My invention is a novel mechanical agricultural transplanter which differs from the old shoe-type tobacco, tomato, and cabbage transplanters in that it uses a punch-plant drop, this feature being so incorporated into the transplanter that it utilizes the latest methods of plant growing, including the use of peat pots composed of peat-moss, and includes the use of a black plastic mulch through which the peat pots with the young plants are set.

The cost of labor to set potted plants through plastic mulch has been relatively expensive and growers have not hereinbefore incorporated the two into their program, but my transplanter is designed to cut the expensive five-sixths, making the use of peat-moss pots and plastic not only financially feasible but a necessity in competition for early market produce.

The principal object of my invention is to provide a novel method and machine constructed to make use of the peat pot and black plastic mulch. Such peat pots are made from a particular type of peat-moss and are used in the growing of plants. The roots will penetrate the walls of the pot, and hence the plant remains in the pot during and after transplanting. The pot, in the soil, eventually decomposes. The black plastic mulch is a black polyethyline film which is laid over the prepared soil in rows to act as a weed control and to retain moisture and heat in the soil. The peat pots are transplanted through the plastic film into the soil beneath.

Other objects of the invention are to provide a machine in which the cylinder type punches are held stationary on the wheel axle and turns as the transplanter's wheels turn. The punches perforate the plastic and make the holes in the plastic and ground for the plant as it turns. The plants to be transplanted are placed in circular holes in a circular turntable with the bottoms of the pots resting on the surface of a stationary shelf directly beneath the circular turntable, the turntable being turned by a chain drive running around a sprocket on the wheel axle and around another sprocket on an axle disposed under the stationary shelf, which latter axle rotates the turntable to bring the plants over a drop tube so that they will drop into the holes the punches have made. Water is added at the moment of drop, and then soil is placed beside the plant by a series of augers. The first auger is housed in steel tube that extends away from the transplanter to the soil beyond the plastic film. Using a skimming method, the soil is forced against the rotating auger which takes it to a hopper above the rows of plants. In the base of the hopper is a second auger turned by a chain from the wheel axle. This auger is housed in a steel tube and is synchronized to deposit the dirt close to each plant hole, and then covering plates press the soil forward and around the plant, covering the pot but permitting the plant to pass between them.

My invention is a peat pot transplanter through plastic mulch and should not be confused with an ordinary transplanter such as the type that transplants bare-rooted unpotted plants directly into the soil using a ditching method; nor with the peat pot transplanter using a similar ditching method. The problem of transplanting through plastic mulch has necessitated the creation of my transplanter.

Further objects of the invention are to provide a machine of the above type in which the punches are mounted fixedly on the main axle, thus providing simplicity of construction, and ready replacement of the punch heads providing for rapid change to comply with different sized pots.

I will explain the invention with reference to the accompanying drawings, which illustrate one practical embodiment thereof to enable others familiar with the art to adopt and use the same, and will summarize in the claims the novel features of construction and novel combinations of parts, for which protection is desired.

In said drawings:

FIG. 7 is a front elevational view of the machine.

Figure 1:
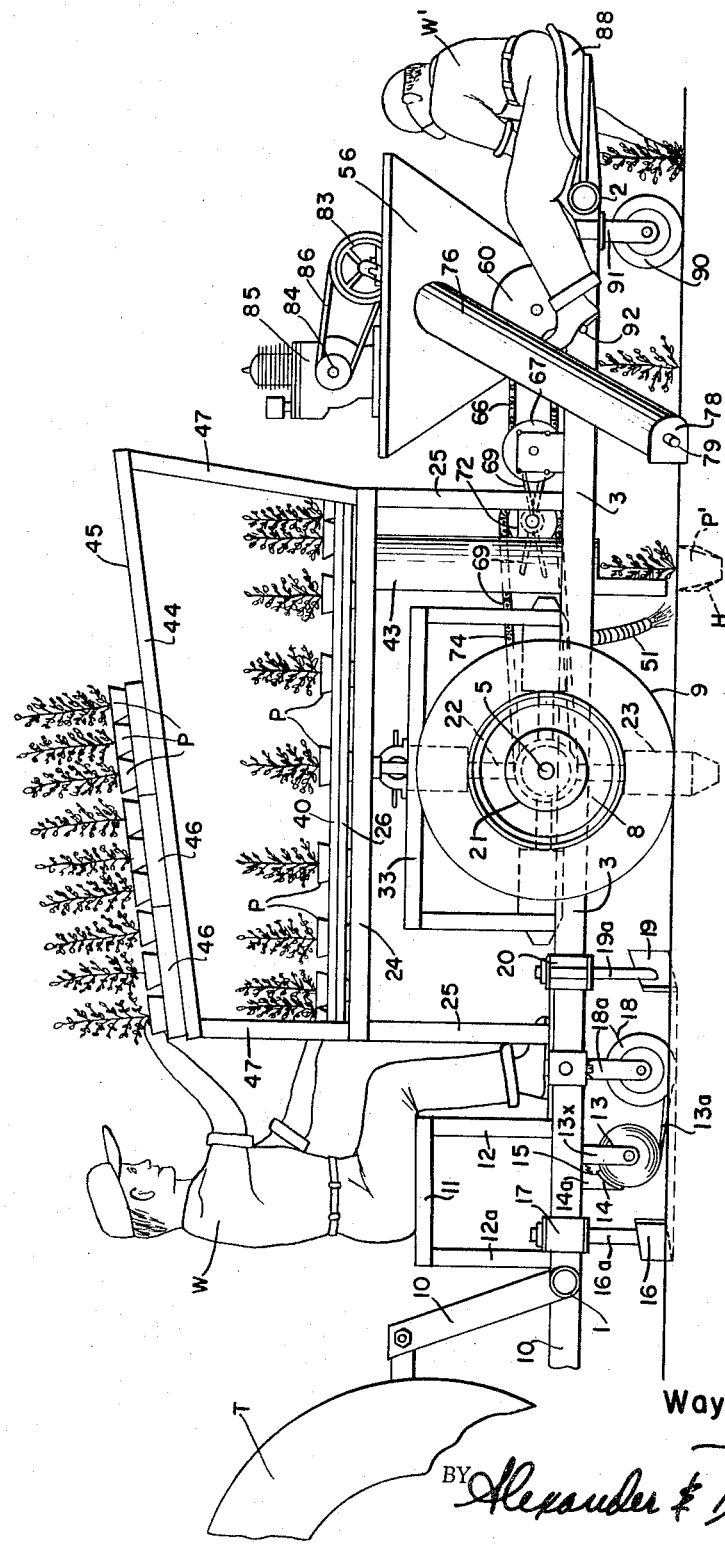
FIG. 1 is a side elevational view of my novel machine as drawn by a tractor or other towing vehicle.

As shown in the drawings, my novel machine comprises a frame preferably formed of pipe having a front horizontal bar 1 and a rear horizontal bar 2 connected by spaced longitudinal bars 3 and 4 at each side of the longitudinal center line, the ends of which bars 3 and 4 are preferably welded to the front and rear bars 1 and 2 to form a rectangular frame.

Figure 3:
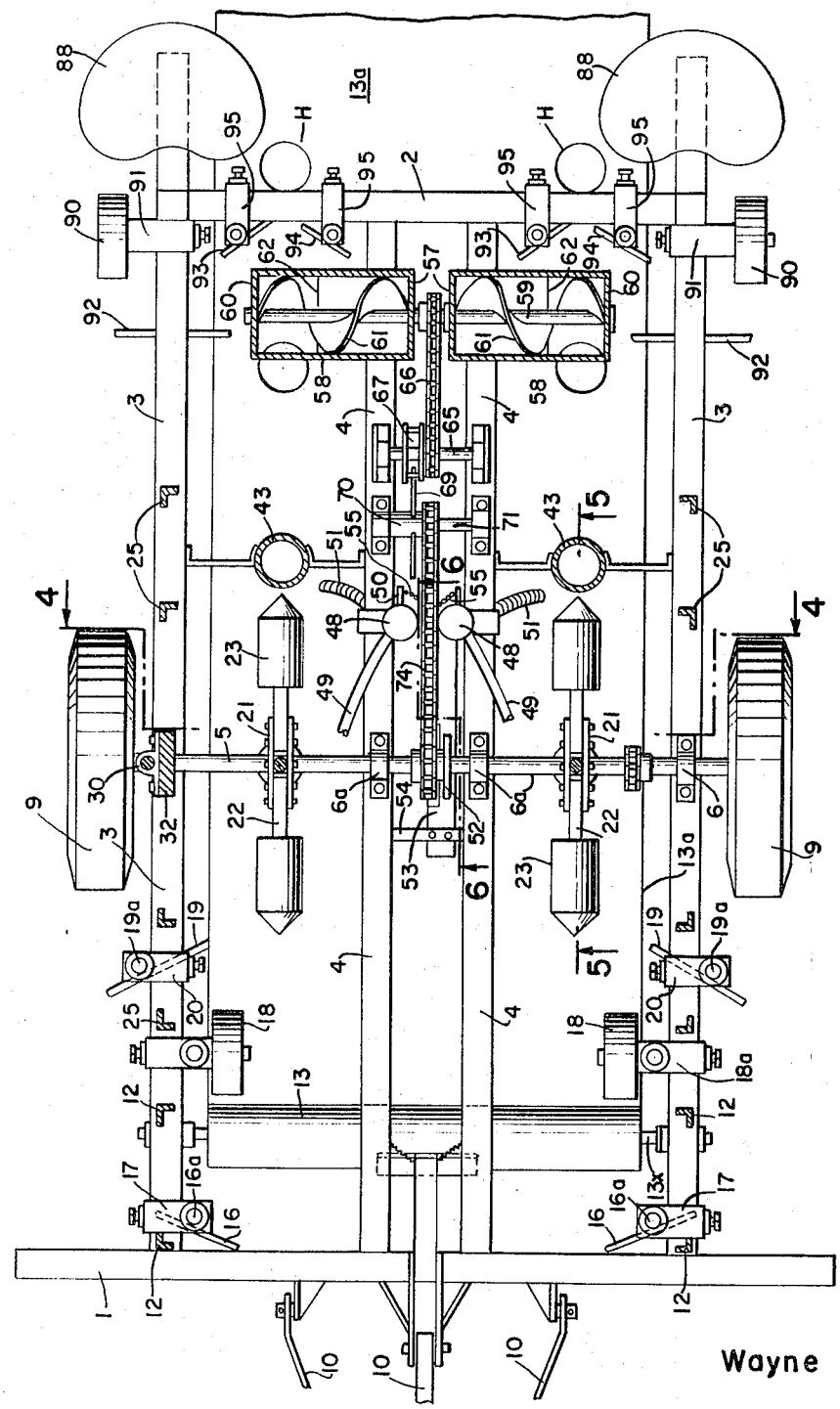
FIG. 3 is a horizontal sectional view, similar to FIG. 2, on a horizontal elevation slightly above the wheeled axle of the machine.
Figure 4:
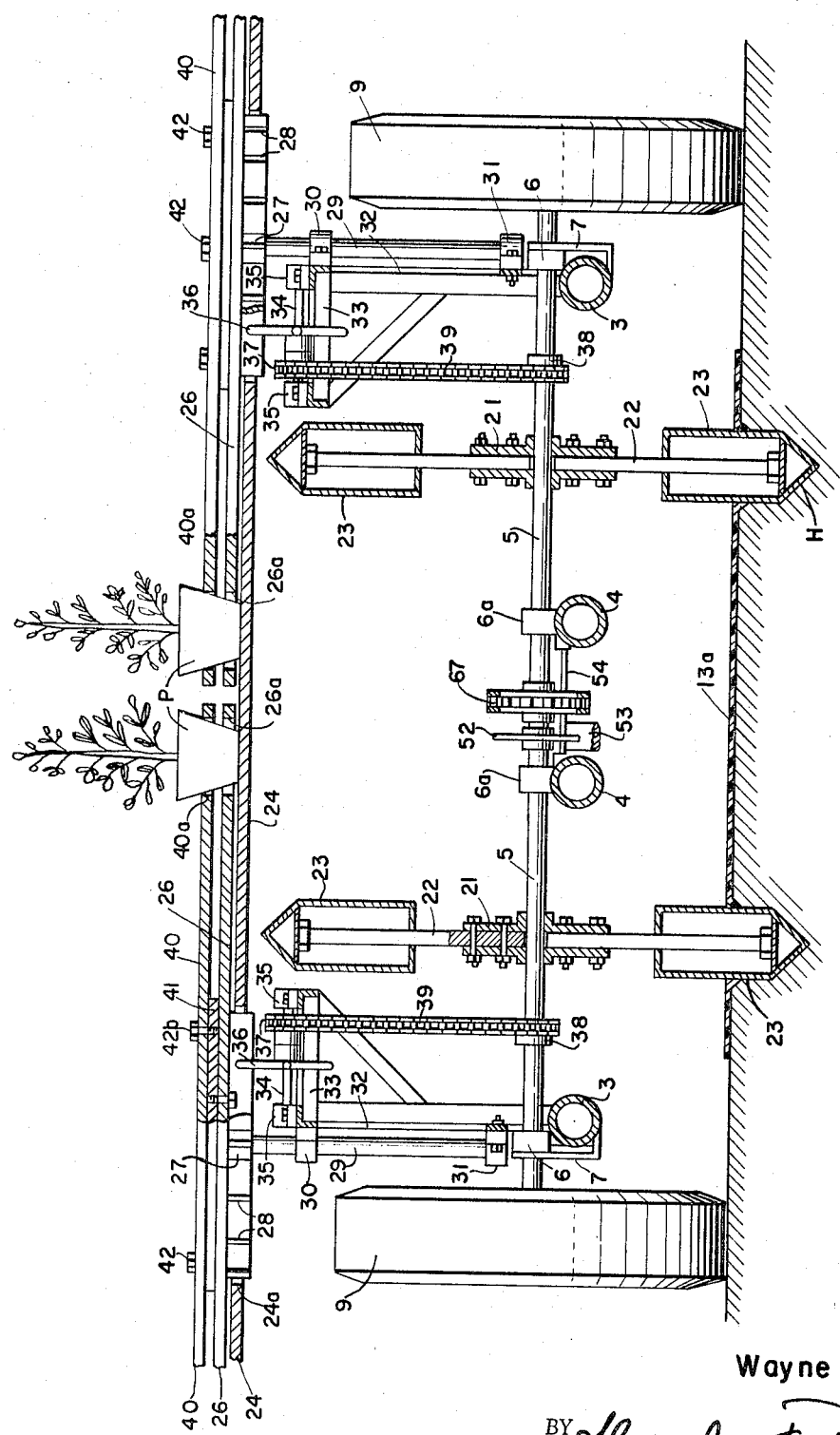
FIG. 4 is an enlarged transverse section on the line 4—4, FIG. 3.

Extending transversely of the frame 1–4 at about its center is an axle 5 which is journaled in bearings 6 carried by brackets 7 secured to each frame member 3 as shown in FIG. 4, the ends of the axle having fixed thereon ground wheels 8 preferably provided with pneumatic tires 9, whereby the axle 5 will rotate with the wheels 8–9. Preferably bearings 6a for the axle 5 are also provided on the intermediate longitudinal frame members 4, as shown in FIGS. 3 and 4.

The front bar 1 of the machine may be connected by links 10 to the rear end of a tractor T, FIG. 1, or the like, so that the machine will trail the tractor with the frame 1–4 maintained in substantial horizontal position. Any other desired form of connection between the frame and tractor may be utilized.

The machine shown in the drawings is designed to plant two adjacent parallel rows of potted plants through the plastic mulch, two workmen being required on the machine for the planting of each how, as hereinafter described.

At the front end of the frame 1–4 is a seat 11 supported upon legs 12, the lower ends of which are secured to the outer frame members 3 as shown in FIGS. 1 and 3, the seat being adapted to accommodate an operator W, in alignment with each row of plants to be transplanted. If desired, additional legs 12a may be provided at the forward corners of the seat connecting the seat at said corners with the outer ends of the front frame member 1.

At the front end of the frame horizontally mounted below the frame 1–4 on swingable arms 13x is a roll 13 of black plastic mulch adapted to lay a web of the mulch on the ground surface beneath the frame as the frame is drawn across the ground by tractor T, the web being indicated as at 13a in FIGS. 1–5, the same being of such width as to cover more than the space between the rows of transplanted plants. As shown in FIGS. 1 and 7, a brake 14 is associated with roll 13, the same being carried by a swingable arm 14a, FIGS. 1 and 10, hingedly mounted between the inner longitudinal frame members 4, the arm 14a being yieldably urged by springs 15 to engage the outer surface of the roll 13 to prevent overrunning of the roll during operation of the machine.

Means are provided for embedding the side edges of the plastic mulch web 13a in the ground surface in order to anchor the web in place and to prevent lifting of the sides of the web by gusts of wind or the like after the mulch web has been laid. As shown, shovels 16 are provided in advance of the roll 13 having shanks 16a which are non-rotatably mounted in brackets 17 mounted upon the outer longitudinal frame members 3, the shovels 16 being adjusted so as to converge inwardly and forwardly as shown in FIG. 3 and are inclined to the horizontal as shown in FIG. 1 so that the inner edge thereof will engage the ground surface in advance of the plastic roll 13 and remove a portion of the dirt laterally so that the side edges of the plastic mulch web 13a will be disposed slightly below the normal ground surface, the side edges of the web 13a being then rolled downwardly into contact with the ground surface by pneumatic rollers 18 which are rotatably carried in brackets 18a mounted on the frame side members 3 somewhat in rear of the roll 13, as clearly shown in FIGS. 1–3, so that when the machine is moving forwardly the rollers 18 will press the sides of the web 13a down into the hollows or recesses formed by the shovels 16.

Figure 10:
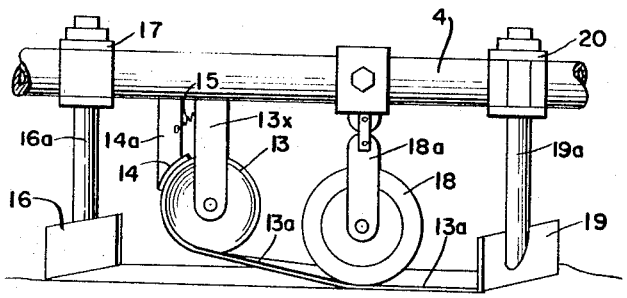
FIG. 10 is an enlarged side elevation of the means for laying the web of black plastic mulch.

Mounted on the frame in rear of the rollers 18 are shovels 19, FIGS. 1, 3, 7 and 10, carried by shanks 19a nonrotatably mounted in brackets 20 carried by the outer longitudinal frame members 3 as shown in the drawings, the shovels 19 being inclined to the vertical and converging inwardly and rearwardly as shown in FIG. 3, in such manner that the shovels 19 will scrape dirt at each side of the web 13a back upon the sides of the web 13a after the transplanting operation has been sufficient to hold the sides of the web embedded in the ground surface, the dirt so remaining on the sides of the web 13a after the transplanting operation has been completed and the machine has traveled farther along the row. FIG. 10 shows in larger detail the arrangement of roll 13, shovels 16, rollers 18 and shovels 19.

Figure 5:
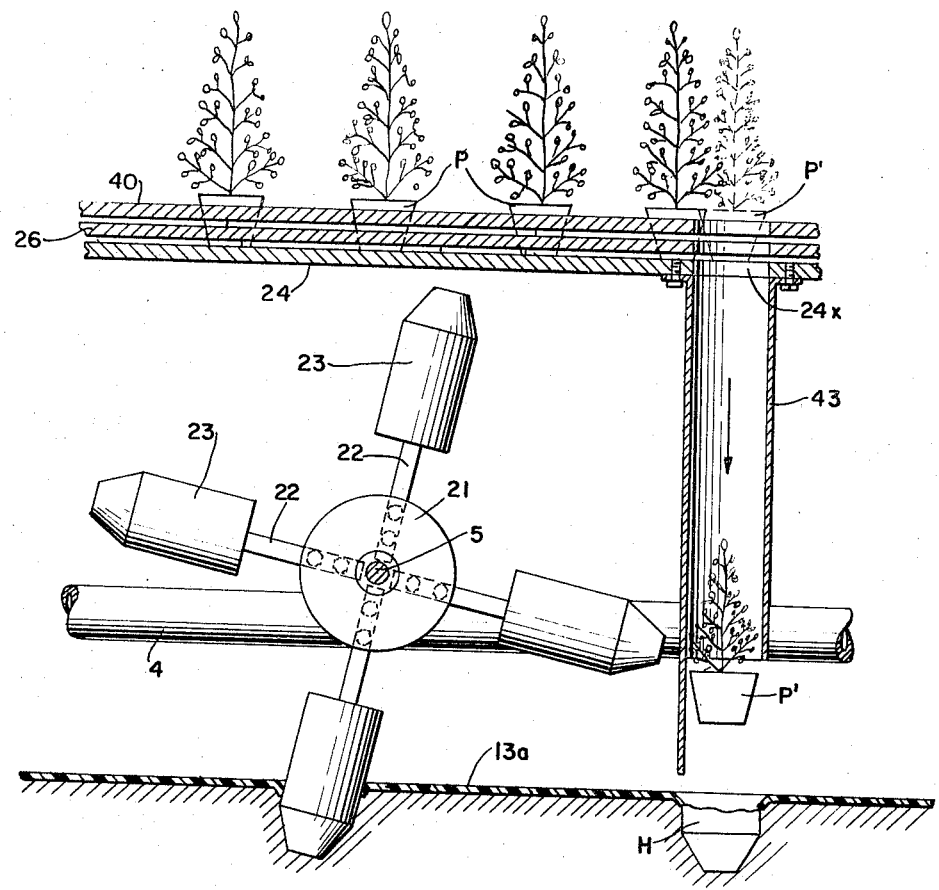
FIG. 5 is an enlarged longitudinal section on the line 5—5, FIG. 3.

In order to punch rows of holes through the plastic web 13a and into the surface of the ground to receive the potted plants which are to be transplanted, I provide on the axle 5 spaced punches, one for each row, the same being shown more particularly in FIGS. 4 and 5. Each pump has a hub 21 keyed to the shaft 5 from which extend spokes 22 equidistantly spaced apart, four such spokes being shown in the drawings, the same being preferably bolted to the hubs 21 and carrying at their outer ends removable punch heads 23, the same having pointed outer ends adapted as the shaft 5 is rotated to punch holes H through the web 13a and into the ground surface, as shown more particularly in FIGS. 4 and 5, which holes receive the potted plants as hereinafter described. Preferably the heads 23 are bolted to the ends of the spokes 22 so as to be removable therefrom and replaceable by other punch heads 23 of larger or smaller diameter, according to the nature and size of the pots to be transplanted.

Above the upper run of the punch heads 23 is a shelf 24 which is horizontally disposed and is supported upon the frame 1–4 by means of uprights 25, FIG. 3. Shelf 24 is preferably of rectangular shape and has its forward edge terminating slightly in rear of the seat 11 and its rear end terminating in advance of the rear frame member 2, and the sides of the shelf 24 extend beyond the outer faces of the wheels 8–9, as shown in FIG. 4. The upper surface of the shelf 24 is adapted to support a series of potted plants to be transplanted as hereinafter described.

Above and cooperating with the shelf 24 is a rotatable plate 26 at each side of the shelf, the plate 26 being of circular shape, as shown in the drawings, and said plate 26 having a hub 27, FIGS. 2 and 4, at its center depending from its underside, said hub having a horizontal series of radial spokes 28 (sixteen being shown) radiating therefrom for the purpose hereinafter described, the hub 27 and spokes 28 being received with a hole 24a in the shelf 24 as shown in FIG. 4.

Hub 27 is fixedly mounted on a vertical shaft 29 journaled in bearings 30–31 which are secured to a vertical plate 32 welded or otherwise secured to each outer longitudinal frame member 3, as shown in FIG. 4, the shaft 29 being prevented from axial movement in the bearings 30 so that the underside of the circular rotatable plate 26 will be somewhat spaced from the upper surface of the shelf 24. The upper end of the plate 32 supports a horizontal frame 33 disposed below the shelf 24 upon which frame 33 is journaled a horizontal shaft 34 in bearings 35, shaft 34 also carrying a rimless series of spokes 36 radiating from a hub fixed to the shaft 34, the outer ends of the spokes 36 engaging the radial spokes 28 of the hub 27 of the circular rotatable plate 26, whereby as the shaft 34 is rotated the circular plate 26 will be correspondingly rotated, for the purpose hereinafter described.

In order to rotate the shaft 34 a chain sprocket 37, FIG. 4, is provided thereon above a chain sprocket 38 keyed to the axle 5, and a chain 39 runs around the sprockets 37–38 in order to rotate the circular plate 26 upon the shelf 24 as the machine is drawn across the ground.

In the circular plate 26 adjacent the periphery thereof are a series of circular holes 26a (sixteen being shown) adapted to receive therein the potted plants P, the bottoms of which pots rest upon the shelf 24, as shown in FIG. 4. The holes in the plate 26 are formed in a circular series as shown in FIG. 2 and the holes are equidistantly spaced apart around the plate 26.

In order to adapt the holes 26a to suit pots of smaller diameter than the holes 26a, I preferably provide above the circular plate 26 a similar adjustable plate 40 spaced from the top or plate 26 by a spacer 41, FIG. 4, and in the periphery of the adjustable plate 40 in a circular series of holes 40a of same size and arrangement as the holes 26a. In order to adjust the effective diameter of the registering holes 26a and 40a the adjustable plate 40 is rotatably adjustable on the plate 26. For this purpose arcuate slots 40b, FIG. 2, are provided in the adjustable plate 40 coaxially thereof through which extend bolts 42 carried by the rotatable plate 26 and having nuts 42b on their upper ends so that when the nuts 42b are loosened the adjustable plate 40 may be rotated slightly in either direction so as to bring the holes 40a slightly out of register with the holes 26a, thereby foreshortening the overall size of the registering holes in plates 26 and 40, as shown in FIG. 2, thereby providing for proper movement of the potted plants P around the shelf 24 where pots of smaller size than those normally useable with the holes 26a–40a are to be transplanted. Any other desired means for adjusting the plate 40 with respect to the rotatable plate 26 to vary the size of the openings 40a–26a may be used.

As shown, the registering holes 40a and 26a are adapted to receive therein the base of a potted plant P to be transplanted, and as the machine is pulled along the ground the rotatable plate 26a will be rotated by the ground wheels 8–9 and the holes formed by the punches 23 will be formed in the mulch 13a, each such hole being adapted to receive a potted plant P.

As shown in FIG. 5, the shelf 24 has an outlet hole 24x therein adapted to register with the holes 24a–26a in the rotating plates 26 and 40, and a chute 43, FIG. 5, extends from the underside of the shelf 24 through which the potted plant P', FIG. 5, will drop after the hole H has been formed through the mulch 13a, the plant P' dropping directly into the hole H, one potted plant being thus deposited in each hole H as the machine travels along the ground surface.

Preferably above the shelf 24, as shown in FIGS. 1 and 7, is an upper forwardly inclined shelf 44 having an upstanding flange 45 extending therearound, said upper shelf 44 being of substantially the same area as the fixed shelf 24 and being inclined towards the operator W, FIG. 1. Shelf 44 is adapted to hold a plurality of boxes 46 of potted plants P whereby the boxes 46 will gravitate towards the operator W, FIG. 1, who, as shown in FIG. 1, may readily transfer a plant P from a box 46 into the empty pockets formed by the holes 40a and 26a to maintain the holes 40a and 26a passing to the chute 43 filled at all times with potted plants P to be transplanted. The upper shelf 44 is preferably supported above the fixed shelf 24 by frame members 47.

The circular plates 26 and 40 enable one operator W to do the work usually requiring four operators on the bare-rooted type transplanters, and the adjustment on the circular plate 40 above the plate 26 makes it quite simple to decrease or increase the size of the holes 26a–40a to match the pot size. The peat pot P does not have to retain its perfect shape to work well in the planter. Being made of peat moss, the pots often break apart easily in handling, and are not transplantable with other planters which depend on the uniformity of the pot for its grasp of the pot.

Figure 6:
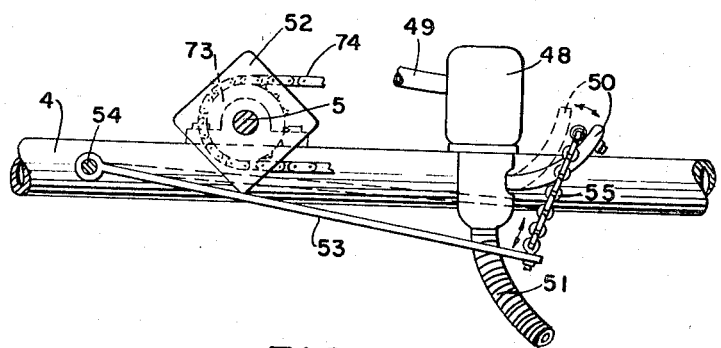
FIG. 6 is an enlarged longitudinal section on the line 6—6, FIG. 3.

Means are provided for depositing an amount of water upon the potted plant P', FIG. 5, immediately after the same has dropped through the drop chute 43 into the preformed hole H which has been punched through the web 13a' As shown in FIGS. 3 and 6, watering valve casings 48 are mounted on the inner longitudinal frame members 4 slightly in advance of the drop tubes 43, see FIG. 3, said valves being supplied through pipes 49 with water from a tank or the like (not shown) preferably mounted on the front of the tractor T so that the valve casings 48 will normally contain measured amounts of water. The outlets of the valve casings 48 are controlled by normally closed valve arms 50, FIG. 6, and the outlets of the casings 48 have flexible pipes 51, the outer ends of which terminate adjacent to and are directed towards the lower ends of the drop tubes 43, as shown in FIG. 3, so that when the valve arms 50 are actuated measured amounts of water will flow through the outlet pipes 51 directly into and upon the potted plants P' just deposited in the holes H, FIG. 5, in order to insure continued growth of the plants in the pots P'.

In order to actuate the valve arms 50 a square cam 52, FIGS. 3 and 6, is rigidly mounted on the axle 5 so as to rotate therewith, said cam 52 cooperating with an actuator arm 53 having its outer end terminating below the frame members 4 and below the arms 50, and having its inner ends pivoted on a shaft 54 between and journaled in the frame members 4, whereby as the cam 52 rotates with the axle 5 the arm 53 will be alternately raised and lowered thereby as the axle 5 rotates.

The outer end of each valve arm 50 is connected by a chain 55 or the like with the outer end of the arm 53 so that when the arm 53 is depressed by engagement with a corner of the square cam 52, the valve arms 50 will assume the position shown in full lines in FIG. 6, but when the flat portion of the cam 52 engages the arm 53 the valve arm 50 will assume the position shown in dotted lines in FIG. 6, thereby closing the valve. As shown in FIG. 3, the same arm 53 controls the valve arm 50 of each valve casing 48. Thus the water from the valve casings 48 is intermittently deposited upon the potted plants P' in each hole H, as the machine is drawn across the field.

Means are provided for automatically covering the pots of the transplanted and watered plants P' of each row with loose dirt as the machine progresses across the field, said means being shown more particularly in FIGS. 1, 2, 3, 8 and 9. Said means consists of a V-shaped hopper 56 at the rear end of the frame 1–4 in rear of the shelf 24, said hopper 56 being open at its upper end and being preferably of rectangular plan, contracting towards its lower end, and having at its lower end an inverted V-shaped division plate 57, FIG. 8, for diverting the dirt from the hopper 56 into a pair of transversely disposed circular casings 58, FIG. 8.

Figure 8:
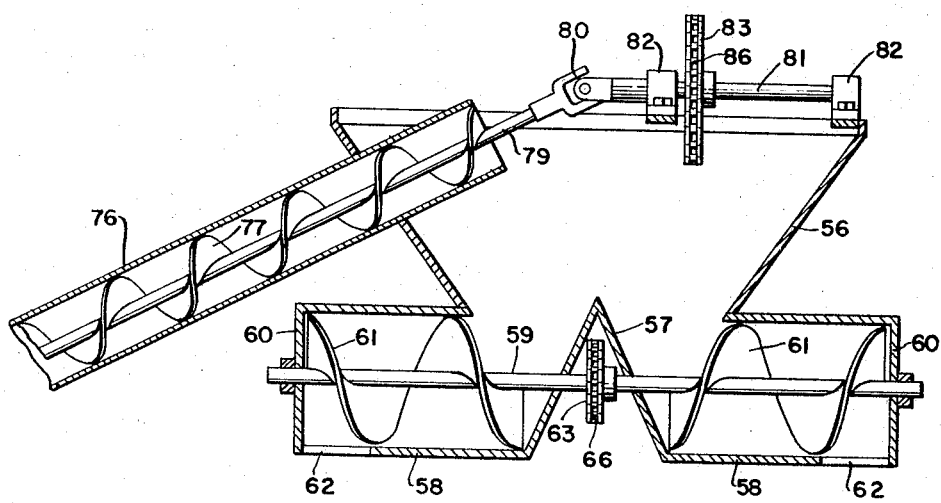
FIG. 8 is an enlarged section on the line 8—8, FIG. 2.

A circular shaft 59 is journaled in the closed ends 60 of the housings 58, FIG. 8, and on the shaft 59 at each side of the inverted V-shaped division plate 57 is mounted an auger 61, one auger being right handed and the other left handed so as to move the dirt in its related casing 58 outwardly towards the closed end 60, whereupon the dirt will drop by gravity through the opening 63, FIG. 8, in the bottom of each casing 58 adjacent the outer end 60, said dirt being intermittently deposited along the axis of each row of potted plants P'.

On the shaft 59 below the division plate 57 of the hopper is keyed a chain sprocket 63, opposite a sprocket 64, FIG. 9, on a shaft 65, FIGS. 3 and 9, mounted in bearings on the inner frame bars 4 in advance of the casings 58, and a chain 66 runs around the sprockets 63–64, as shown.

Figure 9:
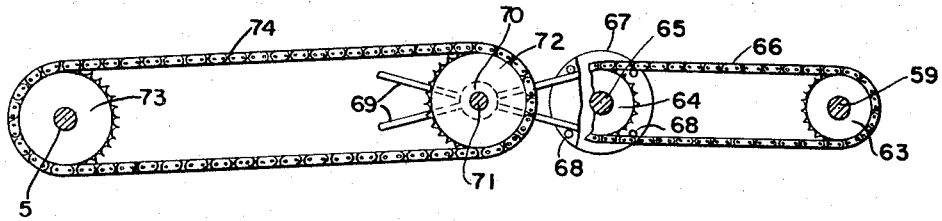
FIG. 9 is an enlarged elevational view of the drive for the dirt covering mechanism.

On the shaft 65 is a wheel 67 which consists of two discs, FIG. 4, which are keyed to the shaft 65 and are spaced apart with four bolts 68, FIG. 9, extending between the plates, the spacing of the bolts 68 being equidistant, and said bolts being adapted to be struck by rotating arms 69, FIG. 9, extending radially from a hub 70 keyed to a shaft 71 also mounted in bearings carried by the inner frame members 4, as shown in FIG. 3, the arms 69 thus intermittently rotating the wheel 67 and hence the auger shaft 59.

Shaft 71 also carries a chain sprocket 72 opposite a chain sprocket 73 keyed to the axle 5, and a chain 74 runs around the sprockets 72–73 so that the arms 69 are rotated intermittently as the axle 5 of the machine rotates to intermittently rotate the auger shaft 59 to thus deposit dirt through the openings 62 in advance of each transplanted plant P' in each row as the machine progresses.

In order to fill the hopper 56 with loose dirt or soil, means are provided for collecting loose dirt at one side of the web 13a and delivering the same into the top of the hopper. As shown, a cylindrical tube 76, FIGS. 1, 2 and 8, housing therein a spiral auger 77 which is journaled at its lower end in the lower end plate 78, FIG. 1, of the tube 76. The upper end of the auger 77 extends through the tube 76 and into the interior of the hopper 56, the auger having a shaft 79, FIG. 8, connected by universal joint 80 to a shaft 81, FIG. 8, journaled in bearings 82 mounted at the top of the hopper 56, said shaft 81 carrying a pulley 83 opposite the drive pulley 84 of a small internal combustion engine 85, FIG. 1, a belt 86 running around the pulleys 83–84 as shown, whereby the auger 77 will be continuously rotated while the engine 85 is operating.

As shown in FIG. 1, the lower or outer end of the tube 76 has a blade 87, FIG. 2, normally disposed about an inch below the ground level, the end of the tube in way of the blade 87 being open to admit dirt loosened by the blade 87 to pass into the interior of the tube 76 and to be raised by the auger 77 upwardly into the hopper 56. In this manner the hopper 56 will be filled with loose dirt obtained at one side of the web of plastic mulch 13a, the dirt being transferred by auger 77 into the hopper, the auger 77 being continuously rotated, and the dirt from the hopper 56 being divided and entering each of the auger casings 58 which are rotated intermittently to deliver dirt through the openings 62, FIG. 8, adjacent each potted plant P' of the rows as the machine progresses.

Figure 2:
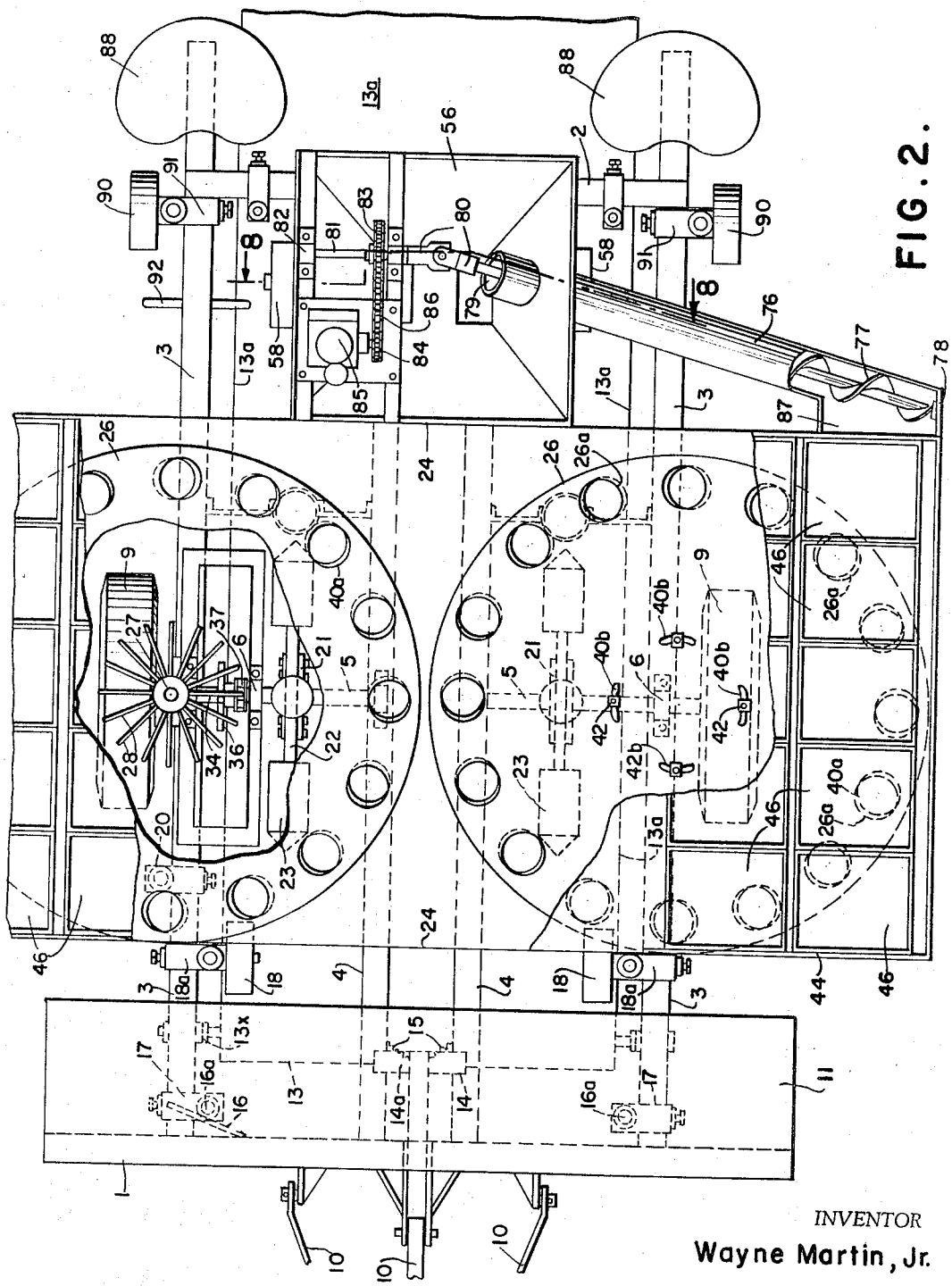
FIG. 2 is a top plan view thereof, partly broken away to show underlying parts.

Preferably the outer longitudinal frame members 3 project rearwardly of the rear frame member 2, as shown in FIGS. 1 and 2, and carries a seat 88 for a second operator W', FIG. 1, whose duty it is to see that the transplanted plants are properly watered and the pots of the plants properly covered with loose dirt as the machine progresses, the operator W' being close enough to the ground to utilize his hands if required.

Preferably, the rear ends of the outer frame members 3 are provided with ground engaging wheels 90 journaled in brackets 91 secured to the frame members 3; and for convenience of the operators W' footrests 92, FIG. 2, on frame members 3 may be provided.

In order to assure that the pots of the transplanted plants are properly covered with loose dirt deposited by the augers 61, I provide a pair of spaced shovels 93-94 journaled in brackets 95 on the rear frame member 2, the inner edges of the pair of shovels 93-94 being spaced apart and straddling the axis of each row of transplanted plants, i.e., disposed in alignment with the holes H, the shovels 93 scraping any dirt which may have been deposited by the augers 61 into alignment with the row of transplanted plants. Because a larger hole is required to plant a potted plant, more dirt is required to fill the void around the pot once it is in a hole and to cover the top of the pot and the edges of the perforation in the plastic. My dirt-covering means picks up the coarse soil on the packed outer edge of the plastic B*a* and by augering it into the hopper 56 and depositing it in quart sized piles beside the individual plants, provides for rapid covering whether it is then pushed around the plant by hand or by the dual shovels 93-94 which permit the plant to pass between them as the shovels catch the crest of the pile of dirt and push it forward. However, the operator W' must follow and do touch-up work.

Thus I have provided a novel transplanter which will, as it moves along the field, first lay a web of black plastic mulch and embed the sides of the web below the ground surface so that the web is close to the ground and wind cannot easily blow the sides of the web upwardly which would cause the edges of the web to escape the pneumatic wheels 18 that press the sides of the web into the premade furrow. The hinged wheel 18 gives flexibility to the wheel, thus eliminating the tearing of the plastic edge which is caused by the use of rigid shanked wheels on other mulchers hereinbefore used. The machine as it moves will then punch holes through the prelaid mulch in single or parallel rows as desired, and will drop a plant which has been potted in peat into the preformed hole, and substantially simultaneously apply water to the transplanted plant, and immediately thereafter cover the transplanted and watered potted plant with a mulch or layer of dirt, each row requiring the services of only two operators W and W'.

While I have shown the machine as applying two parallel rows of plants, obviously the machine may be modified to plant only a single row or more than two rows simultaneously, and I therefore do not limit my invention to the exact form shown in the drawings, for obviously changes may be made therein within the scope of the claims.

I claim:

1. The method of transplanting continuous rows of plants prepotted in pots of peat moss through continuous webs of black plastic mulch on the ground surface, comprising the steps of laying a continuous web on the ground surface unwound from a roll of said mulch and embracing one or more said rows; continuously embedding the sides of said web below the ground surface as the web is layered and covering the embedded sides with loose earth; continuously punching pot-receiving spaced holes through said layed web and into the underlying ground surface; continuously depositing potted plants in each hole as it is so punched; intermittently feeding an amount of water onto each potted plant so deposited according to the spacing of the plants in said rows; intermittently depositing on the web loose earth taken from beyond the side of the web according to the spacing of the plants in said rows; and continuously directing the earth so deposited to fill the holes and cover the pots of the watered plants.

2. In a method as set forth in claim 1, said embedding step including the steps of scraping shallow furrows in the ground surface at the sides of the web in advance of the laying step, said furrows receiving the sides of the web when layed; rolling the sides of the web down into said furrows; and scraping loose earth from beyond the sides of the web onto the rolled sides to cover the same.

3. A machine for transplanting rows of potted plants through a web of plastic mulch, comprising a horizontal frame adapted to travel across the ground; a transverse axle journaled on said frame; ground wheels fixed on said axle; a roll of plastic mulch on the frame adapted to unwind and leave a web on the ground as the frame travels; means adjacent the roll for embedding the sides of the web below the ground; means in rear of the embedding means for continuously punching parallel rows of spaced pot-receiving holes in the web and into the ground; a shelf on said frame above the punching means; conveyor means on said shelf for moving series of potted plants from loading points to delivery points; drop-tubes at the delivery points of the shelf for delivering potted plants successively into the last punched holes; means on the frame for delivering water successively onto the last deposited plants in said holes; means on the frame for intermittently and successively actuating the watering means according to the spacing of the plants in said rows; means on the frame for delivering loose dirt collected from beyond the side of the web and intermittently and successively depositing same on the web in alignment with the rows of watered plants according to the spacing of the plants in said rows; and means for continuously directing the dirt so deposited to successively fill the holes around the pots and to cover the tops of the pots in the holes.

4. In a machine as set forth in claim 3, said embedding means comprising shovels on the frame in advance of said roll for forming shallow furrows at opposite ends of said roll to receive the sides of the web; presser rolls on the frame in rear of the roll for pressing the sides of the web down into said furrows; and second shovels in rear of said presser rolls for scraping dirt from beyond the sides of the web and for directing said dirt onto the sides of the web received in said furrows.

5. In a machine as set forth in claim 3, a brake on the frame yieldably engaging the roll of plastic mulch for preventing overrunning of said roll as the machine travels.

6. In a machine as set forth in claim 3, said punching means comprising a hub for each row of plants fixed on said axle, each hub having a series of radial spokes spaced equidistantly apart; and punch heads removably mounted on said spokes respectively and adapted when the axle is rotated to successively punch holes through the web and into the underlying ground.

7. In a machine as set forth in claim 6, said watering means comprising valved casings for each row connected to a water supply and disposed on the frame adjacent the drop-tubes, said casings having outlets for directing water onto the plants in the last punched holes in the web; normally raised valve arms for operating said valves; and said means for intermittently actuating the watering means comprising a polygonal plate cam fixed on said axle having corners corresponding to the number of punch heads; an arm pivoted at one end on said frame and underlying the edge of the plate cam; the outer end of the arm being connected to the said valve arms, whereby as the axle is rotated the valve arms will be intermittently lowered and raised.

8. In a machine as set forth in claim 3, said conveyor means comprising rotatable circular plates above said shelf each having a hub; means for rotating the hubs by the axle; each plate having a circular series of holes therein adapted to receive potted plants therein resting on the shelf, whereby when the plates are rotated the plants will be moved on the shelf from the loading point to the delivery point; said shelf having holes therethrough at the delivery points; and said drop-tubes being disposed on the underside of the shelf and registering with said last named holes and directing potted plants into the last punched holes in the web.

9. In a machine as set forth in claim 8, a bench at the loading point for a workman for each row of plants; and a second shelf above the circular plate inclined towards said bench and adapted to hold a supply of potted plants to be individually inserted by the workman into the empty series of holes in the circular plate passing towards the delivery point.

10. In a machine as set forth in claim 8, a second circular plate rotatably adjustably mounted on the first circular plate and having a circular series of holes therein of same size and arrangement as those in the first circular plate, whereby the effective diameter of the registering holes in the said plates may be reduced to suit pots of smaller diameter.

11. In a machine as set forth in claim 3, said means for delivering loose dirt comprising a hopper on the frame beyond the shelf; a lateral tube extending forwardly and downwardly from the upper end of the hopper with its lower end engaging the ground beyond the adjacent side of the web; a ground digging blade at the lower end of the tube for scooping up earth and directing same into the lower end of the tube; an auger in said tube for carrying the loosened earth up into the hopper; means for continuously rotating the auger; and lateral tubular extensions at each side of the base of the hopper receiving the dirt from the hopper, said extensions having outlets adjacent their outer ends for depositing the dirt on the web in substantial alignment with each row of plants.

12. In a machine as set forth in claim 11, right and left hand augers respectively mounted in the tubular extensions; a shaft journaled on the frame and driven by the axle; a second shaft journaled on the frame parallel with the first shaft and driving the right and left hand augers respectively; and intermittent driving connections between said shafts, whereby spaced deposits of loose earth will be discharged on the web in alignment with the axes of the rows of plants.

13. In a machine as set forth in claim 12, said dirt directing means comprising a pair of forwardly and outwardly diverging spaced blades for each row on the frame adapted to straddle the rows of plants as the machine travels and to scrape the dirt so deposited on the web into the pot-containing and watered holes and to cover the tops of the pots therein as the machine travels.

14. A machine for transplanting rows of potted plants through a web of plastic mulch, comprising a horizontal frame adapted to travel across the ground; a transverse axle journaled on said frame; ground wheels fixed on said axle; a roll of plastic mulch on the frame adapted to unwind and leave a web on the ground as the frame travels; a brake on the frame yieldably engaging the roll of plastic mulch for preventing overrunning of said roll as the machine travels; means adjacent the roll for embedding the sides of the web below the ground; a hub for each row of plants fixed on said axle, each hub having a series of radial spokes spaced equidistantly apart; punch heads removably mounted on said spokes, respectively, and adapted when the axle is rotated to successively punch parallel rows of pot-receiving holes through the web and into the underlying ground; a shelf on said frame above the punching means; conveyor means on said shelf for moving series of potted plants from loading points to delivery points; drop-tubes at the delivery points of the shelf for delivering potted plants successively into the last punched holes; means on the frame for delivering water successively onto the last deposited plants in said holes; means on the frame for intermittently and successively actuating the watering means according to the spacing of the plants in said rows; means on the frame for delivering loose dirt collected from beyond the side of the web and intermittently and successively depositing same on the web in alignment with the rows of watered plants according to the spacing of the plants in said rows; and means for continuously directing the dirt so deposited to successively fill the holes around the pots and to cover the tops of the pots in the holes.

15. In a machine as set forth in claim 14, said embedding means comprising shovels on the frame in advance of said roll for forming shallow furrows opposite the ends of said roll to receive the sides of the web; presser rolls on the frame in rear of the roll for pressing the sides of the web down into said furrows; and second shovels in rear of said presser rolls for scraping dirt from beyond the sides of the web and for directing said dirt onto the sides of the web received in said furrows.

16. In a machine as set forth in claim 14, said watering means comprising valved casings for each row connected to a water supply and disposed on the frame adjacent the drop-tubes, said casings having outlets for directing water onto the plants in the last punched holes in the web; normally raised valve arms for operating said valves; and said means for intermittently actuating the watering means comprising a polygonal plate cam fixed on said axle having corners corresponding to the number of punch heads; an arm pivoted at one end on said frame and underlying the edge of the plate cam; the outer end of the arm being connected to the said valve arms, whereby as the axle is rotated the valve arms will be intermittently lowered and raised.

17. In a machine as set forth in claim 14, said conveyor means comprising rotatable circular plates above said shelf each having a hub; means for rotating the hub by the axle; each plate having a circular series of holes therein adapted to receive potted plants therein resting on the shelf, whereby when the plates are rotated the plants will be moved on the shelf from the loading point to the delivery point; said shelf having holes therethrough at the delivery points; and said drop-tubes being disposed on the underside of the shelf and registering with said last named holes and directing potted plants into the last punched holes in the web.

18. In a machine as set forth in claim 14, said means for delivering loose dirt comprising a hopper on the frame beyond the shelf; a lateral tube extending forwardly and downwardly from the upper end of the hopper with its lower end engaging the ground beyond the adjacent side of the web; a ground digging blade at the lower end of the tube for scooping up earth and directing same into the lower end of the tube; an auger in said tube for carrying the loosened earth up into the hopper; means for continuously rotating the auger; and lateral tubular extensions at each side of the base of the hopper receiving the dirt from the hopper, said extensions having outlets adjacent their outer ends for depositing the dirt on the web in substantial alignment with each row of plants.

19. In a machine as set forth in claim 18, right and left hand augers respectively mounted in the tubular extensions; a shaft journaled on the frame and driven by the axle; a second shaft journaled on the frame parallel with the first shaft and driving the right and left hand augers respectively; and intermittent driving connections between said shafts whereby spaced deposits of loose earth will be discharged on the web in alignment with the axes of the rows of plants.

20. In a machine as set forth in claim 19, said dirt directing means comprising a pair of forwardly and outwardly diverging spaced blades for each row on the frame adapted to straddle the rows of plants as the machine travels and to scrape the dirt so deposited on the web into the pot-containing and watered holes and to cover the tops of the pots therein as the machine travels.

References Cited by the Examiner

UNITED STATES PATENTS

| | | | |
|---|---|---|---|
| 1,176,324 | 3/1916 | Spurgeon | 111—3 |
| 2,625,122 | 1/1953 | Carelock | 111—3 |
| 2,749,855 | 6/1956 | Guigas | 111—3 |
| 2,961,979 | 11/1960 | Stanley et al. | 111—3 |
| 3,103,186 | 9/1963 | Saifuku | 111—2 |
| 3,176,635 | 4/1965 | Mabon | 111—3 |

ABRAHAM G. STONE, *Primary Examiner.*

R. E. BAGWILL, *Assistant Examiner.*